3,275,584
POLYVINYL CHLORIDE PLASTICIZED WITH THE ADDITION PRODUCTS OF ALPHA,BETA-UNSATURATED DICARBOXYLIC ESTERS WITH EPOXIDIZED FATTY ESTERS
William M. Kraft, Verona, and Richard Green, Livingston, N.J., assignors, by mesne assignments, to Tenneco Chemicals, Inc., a corporation of Delaware
No Drawing. Filed Mar. 22, 1962, Ser. No. 181,821
20 Claims. (Cl. 260—23)

This invention relates to epoxidized polycarboxylates and to methods for their preparation. It further relates to vinyl halide compositions that contain these epoxidized polycarboxylates as plasticizers.

The rapidly expanding industry utilizing vinyl halide resins has created a need for plasticizers that will render the finished articles of manufacture more useful, more versatile in application, and more nearly permanent. Plasticizers are required, for example, to reduce the molding temperature of the vinyl halide resin and to increase the strength, flexibility, and toughness of films that may be calendered, cast, or deposited from solutions. To be useful in vinyl halide resin compositions, plasticizers should exhibit substantial compatability or solvating power for the resins, they should resist extraction by oils or water, they should not exude from the plasticized resin compositions, and they should not volatilize or migrate to other objects in contact with the plasticized compositions. In addition, plasticizers should be non-toxic, non-corrosive, free from objectionable odors, light in color, and stable at elevated temperatures. They should also retain their effectiveness at low temperatures so that the plasticized resin compositions do not become brittle when cooled.

In accordance with the present invention, it has been found that vinyl halide resin compositions that contain certain epoxidized polycarboxylates as plasticizer are characterized by an excellent combination of properties. These epoxidized polycarboxylates have excellent compatability and long-term retention of compatibility with vinyl halide resins. They impart to the resinous compositions a high degree of low temperature flexibility, high mechanical strength, and good resistance to extraction by oils, solvents, and soaps. In addition resinous compositions containing these novel plasticizers have good color and excellent stability on exposure to heat and to light.

The epoxidized polycarboxylates that have been found to be valuable as plasticizers for vinyl halide resins are condensation products formed by the reaction of $\alpha,\beta$-ethylenically unsaturated dicarboxylic acid esters with epoxidized fatty acids esters.

The reaction by which the epoxidized polycarboxylates are prepared is one of simple addition in which one or more moles of an $\alpha,\beta$-ethylenically unsaturated dicarboxylic acid is added to one mole of an ester of an epoxidized fatty acid that contains from 10 to 22 carbon atoms and from 1 to 3 epoxy

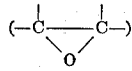

groups. The addition takes place at a carbon atom or at carbon atoms adjacent to the carbon atoms to which the oxirane oxygen atom is attached to form products that are substantially free of polymeric materials and that consist principally of non-resinous products of the addition of one or two moles of the unsaturated dicarboxylic acid ester to one mole of the epoxidized fatty acids ester.

The reaction by which the novel addition products are prepared may be illustrated by the following equation in which one mole of an ester of maleic acid is added to one mole of a 9,10-epoxystearate:

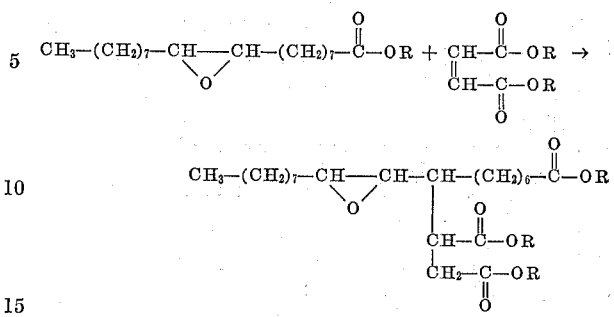

The epoxidized polycarboxylates of the present invention may be readily prepared by heating an ester of epoxidized fatty acids with an ester of an $\alpha,\beta$-ethylenically unsaturated dicarboxylic acid in the presence of a free radical promoter. The resulting products may contain from 3 to 13 carboxylate groups per molecule depending upon the number of moles of the unsaturated dicarboxylic acid ester that is added per mole of the epoxidized fatty acids ester. In most cases the products contain from 3 to 7 carboxylate groups per molecule. The compounds that are preferred for use as plasticizers for vinyl halide resins are those that contain from 3 to 5 carboxylate groups per molecule, that is, the products of the addition of 1 or 2 moles of the unsaturated dicarboxylic acid ester per mole of the epoxidized fatty acids ester or mixtures of these addition products.

The epoxidized fatty acids esters that may be used in the preparation of the epoxidized polycarboxylates are those that contain from 10 to 22 carbon atoms and at least one epoxy group in the acid portion of the molecule and that are substantially free from ethylenic unsaturation. These epoxidized esters may be obtained by reacting an ester of the corresponding unsaturated fatty acids with an oxidizing agent, such as peracetic acid, perbutyric acid, or perbenzoic acid, or by esterifying the appropriate epoxidized fatty acids. Processes for the epoxidation of fatty acids and fatty acids esters are well known in the art and are described, for example, in Patents No. 2,458,484, No. 2,485,160, and No. 2,569,502.

The ester that may be oxidized to form epoxidized esters that are useful in the preparation of the epoxidized polycarboxylates are water-insoluble, ethylenically unsaturated esters of (a) an ethylenically saturated monohydric or polyhydric alcohol, such as methanol, ethanol, isopropanol, n-butanol, tert. butanol, n-hexanol, 2-ethylhexanol, decanol, hexadecanol, octadecanol, cyclohexanol, benzyl alcohol, diphenyl carbinol, phenylethyl alcohol, ethylene glycol, diethylene glycol, 1,2-propylene glycol, 2-ethylhexanediol-1,3, butandiol-1,3, butanediol-1,4, dodecanediol-1,12, glycerol, trimethylolethane, trimethylolpropane, pentaerythritol, dipentaerythritol, sorbitol, and the like and (b) a fatty acid containing from 10 to 22 carbon atoms and from 1 to 3 double bonds, such as decylenic acid, undecylenic acid, oleic acid, petroselic acid, linoleic acid, linolenic acid, eleostearic acid, erucic acid, and brassidic acid. To this group of esters may be added the naturally occurring vegetable oils, which are triglycerides of fatty acids, such as soybean oil, corn oil, cottonseed oil, sunflower seed oil, sesame oil, peanut oil, linseed oil, and perilla oil, as well as esters formed by the reaction of mixtures of vegetable oil fatty acids with any of the aforementioned alcohols.

The preferred epoxidized esters are esters of epoxidized soybean oil fatty acids and esters of epoxidized tall oil fatty acids (hereinafter referred to as "epoxyltallates"). Illustrative of these preferred esters are epoxidized soybean oil; pentaerythritol tetra (epoxytallate), the preparation of which is described in co-pending application Serial No. 784,057, which was filed by William M. Kraft and James P. Scullin on December 31, 1958; now abandoned; 2-ethylhexyl epoxytallate and butyl epoxytallate. A single epoxidized ester or a mixture of two or more of these esters may be used in the preparation of the epoxidized polycarboxylates.

The oxirane oxygen content of the epoxidized esters is not critical, but should be sufficient to impart the desired compatibility and stability to the addition products. In general epoxidized esters having oxirane oxygen contents of approximately 3% to 10% and preferably 5% to 8% may be used in the preparation of the epoxidized polycarboxylates.

The esters to which the aforementioned epoxidized fatty acids esters are added to form the epoxidized polycarboxylates have the formula:

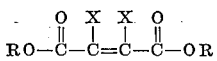

wherein each R represents an alkyl group containing from 1 to 18 carbon atoms or an aryl group and each X represents a hydrogen atom, a halogen atom, an alkyl group, or an aryl group. Useful esters include, for example, the methyl, propyl, octyl, decyl, octadecyl, phenyl, chlorophenyl, hydroxyphenyl, and tolyl esters of maleic acid, maleic anhydride, fumaric acid, citraconic acid, citraconic anhydride, mesaconic acid, chloromaleic acid, chloromaleic anhydride, bromomaleic acid, chlorofumaric acid, bromofumaric acid, phenylmaleic acid, chlorophenylmaleic acid, and the like. The preferred esters are those obtained by the esterification of maleic anhydride or fumaric acid with an alkanol containing from 4 to 10 carbon atoms, for example, dibutyl maleate, dihexyl maleate, didecyl maleate, dibutyl fumarate, dioctyl fumarate, didecyl fumarate, butyl hexyl maleate, and hexyl octyl fumarate.

The reaction of the epoxidized fatty acids ester with the ester of the unsaturated dicarboxylic acid may be effected by heating the reactants together at a temperature between approximately 30° C. and 250° C. and preferably between 60 C. and 180° C. in the presence of a free-radical promoter.

The free-radical promoter that is used to catalyze the reaction may be any of the compounds that are known to promote the formation of free radicals. These include, for example, benzoyl peroxide, acetyl peroxide, lauroyl peroxide stearoyl peroxide, cumene hydroperoxide, p-menthane hydroperoxide, tert. butyl peracetate, tert. butyl perbenzoate, azobisbutyronitrile, azobisbutyramide, azobisbutyrate esters, and the like. A single catalyst or a mixture of these catalysts may be used. Generally approximately 1% to 10% and preferably 2% to 5% of the free radical catalyst, based on the weight of the reactants, is used.

The amount of the ester of the unsaturated dicarboxylic acid that is used is ordinarily at least one mole per mole of the epoxidized fatty acids ester, with the amount used in each case depending upon the properties desired in the product. When approximately equimolar amounts of the reactants are used, the product consists largely of the product of the addition of one mole of the unsaturated di-carboxylic acid ester per mole of the epoxidized fatty acids ester. The use of approximately 1.2 to 2 moles of the unsaturated di-carboxylic acid ester per mole of the epoxidized fatty acids ester yields products that are mixtures of 1:1 and 2:1 (unsaturated dicarboxylic acid ester: epoxidized fatty acids ester) addition products. More than 2 moles of the unsaturated dicarboxylic acid ester per mole of epoxidized fatty acids ester is used when it is desired that the product consist principally of products of the addition of two or more moles of the unsaturated dicarboxylic acid ester per mole of the epoxidized fatty acids ester.

The present addition products are stable, high-boiling, clear materials that range from viscous liquids to semi-solid masses. They may be advantageously employed for a variety of industrial purposes, for example, as lubricant additives or as intermediates in the production of surface-active agents. They are particularly valuable as plasticizers for vinyl halide resins, serving not only to soften the resins, but also to impart to them a number of valuable properties.

Various formulations containing the epoxidized polycarboxylates as plasticizer show an all-around performance substantially equal or superior to that of conventionally-modified compositions. The novel resinous compositions show low brittle points and low volatility and are resistant to solvent extraction to an extent substantially the same as or superior to di-2-ethylhexyl phthalate-modified compositions. The epoxidized polycarboxylates are compatible with vinyl halide resin compositions and show little or no exudation even at high plasticizer contents. In addition vinyl halide resin compositions that contain the epoxidized polycarboxylates as plasticizer are characterized by good heat and light stability.

The amount of the epoxidized polycarboxylates that is used in vinyl halide resin compositions may be varied over a wide range depending upon the choice of plasticizer and on the properties desired in the plasticized resin. The amount of plasticizer used is ordinarily in the range of 5 to 100 parts per 100 parts by weight of the vinyl halide resin. In most cases the plasticizers are used in amounts ranging from 10 to 90 parts per 100 parts by weight of the resin. The resinous compositions may contain other plasticizers in addition to the novel epoxidized polycarboxylates. Heat and light stabilizers, pigments, solvents, fillers, extenders, and the like may also be present in the amounts ordinarily employed for these purposes.

The halogen-containing resins in which the epoxidized polycarboxylates may be used as plasticizers are the resinous products obtained by the polymerization of a vinyl halide in the presence or the absence of another polymerizable compound. The term "vinyl halide resin" as used herein includes vinyl halide homopolymers, such as polyvinyl chloride, polyvinyl bromide, and polyvinylidene chloride, as well as copolymers formed by the copolymerization of a vinyl halide with at least one other polymerizable mono-olefin, such as vinyl acetate, vinyl propionate, vinyl butyrate, vinylidene chloride, styrene, methyl methacrylate, dialkyl fumarates, dialkyl maleates, and the like. The vinyl halide used is ordinarily and preferably the chloride, but the bromide and fluoride may also be used. The copolymers useful in the practice of this invention are those prepared from at least 70% of a vinyl halide and up to 30% of the other polymerizable mono-olefinic compound.

The present plasticizers may be incorporated in the vinyl halide resin by any suitable process, such as calendering, mixing, or kneading of the ingredients. For example, the vinyl halide resin, plasticizer, and other ingredients may be mixed together with or without the aid of a volatile solvent and the resulting mixture milled on rolls at 200° F. to 350° F. until it is homogeneous. The resin may then be removed from the mill in the form of a sheet or film of the desired thickness which may be used as such or subjected to polishing or embossing treatment. Alternatively, the plasticizer may be incorporated by dissolving it in a solution of the resin and subsequently recovering the plasticized resin.

The preparation of the novel plasticizers and their use in vinyl halide resin compositions is illustrated by the examples that follow. It is to be understood, however, that these examples are given solely for the purpose of illustration and that the invention is not to be regarded as being limited to any of the specified materials or conditions recited therein except as set forth in the appended claims.

Example 1

To a flask equipped with a mechanical stirrer and a Dean-Stark trap surmounted by a reflux condenser were added 416 grams (1.0 mole) of 2-ethylhexyl epoxytallate (Flexol EP-8) (oxirane content, 5.1%), 228 grams (1.1 moles) of dibutyl maleate, and 19.3 grams of tert. butyl peroxide. This mixture was heated to 150° C. in 50 minutes and held at that temperature for 5.5 hours. The resulting reaction mixture was heated to 225° C./3 mm. to distill off water and unreacted starting materials. The residue, which weighed 609.7 grams, had an oxirane oxygen content of 2.8%.

Example 2

A mixture of 416 grams of 2-ethylhexyl epoxytallate (Flexol EP-8) (oxirane content, 5.1%), 228 grams of dibutyl fumarate, and 19.3 grams of tert. butyl peroxide was heated at 150° C. for 5.5 hours. The resulting reaction mixture was heated to 225° C./3 mm. to distill off water and unreacted starting materials. The residue, which weighed 638.8 grams, had an iodine number of 5.38 and an oxirane oxygen content of 2.76% (calculated for the 1:1 addition product: oxirane oxygen content, 2.48%).

Example 3

A mixture of 311.9 grams (0.75 mole) of 2-ethylhexyl epoxytallate (Flexol EP-8), 342 grams (1.5 moles) of dibutyl maleate, and 19.4 grams of tert. butyl peroxide was heated at 150°–155° C. for about 6 hours. The reaction product was heated to 225° C./3 mm. to distill off water and unreacted starting materials. The residue, which weighed 535.3 grams, had an iodine number of 4.94, a saponification number of 277.2, and an oxirane oxygen content of 2.38%.

Example 4

A mixture of 311.9 grams of 2-ethylhexyl epoxytallate (Flexol EP-8), 342 grams of dibutyl fumarate, and 19.4 grams of tert. butylperoxide was heated at 155° C. for about 6 hours. The reaction product was heated to 225° C./3 mm. to distill off water and unreacted starting materials. The residue, which weighed 609 grams, had an iodine number of 5.02, a saponification number of 268.4, and an oxirane oxygen content of 2.00%.

Example 5

A mixture of 256 grams (1 mole) of epoxidized soybean oil (oxirane oxygen content, 6.26%), 228 grams (1.1 mole) of dibutyl fumarate, and 13.5 grams of butyl peroxide was heated at 150° C. for about 6 hours. The reaction product was heated to 225° C./3 mm. to distill off water and unreacted starting materials. The residue, which weighed 452 grams, had an iodine number of 3.84, a saponification number of 246.7, and an oxirane oxygen content of 3.00%.

Example 6

A mixture of 410 grams (1.1 moles) of butyl epoxytallate (KP-90), 228 grams (1.1 moles) of dibutyl maleate, and 19.2 grams of tert. butyl peroxide was heated at 150°–160° C. for about 6 hours. The reaction mixture was heated to 225° C./3 mm. to distill off water and unreacted starting materials. The residue, which weighed 635.5 grams, had an iodine number of 3.22, a saponification number of 264.7, an oxirane oxygen content of 2.18%, and a molecular weight of 447.

Example 7

A mixture of 155 grams of pentaerythritol tetra (epoxytallate) (oxirane oxygen content, 5.46%), 114 grams of dibutyl maleate, and 8.1 grams of tert. butyl peroxide was heated at 150° C. for about 7 hours. The reaction mixture was heated to 225° C./3 mm. to distill off water and unreacted starting materials. The residue, which weighed 214 grams, had an iodine number of 256.6, and an oxirane oxygen content of 3.4%.

Example 8

A mixture of 410 grams of butyl epoxytallate (KP-90) which has a molecular weight of 354, specific gravity at 25° C. of 0.910, refractive index at 25° C. of 1.451, and flash point (Cleveland and Open Cup) of 210° C., 144 grams of dimethyl maleate, and 16.6 grams of tert. butyl peroxide was heated at 150°–170° C. for about 7.5 hours. The reaction mixture was heated to 225° C./3 mm. to distill off water and unreacted starting materials. The residue, which weighed 451.5 grams, had an iodine number of 3.31, a saponification number of 244, and an oxirane oxygen content of 2.94%.

Example 9

Plasticized polyvinyl chloride compositions were prepared by the following procedure: To a mixture of 100 parts of polyvinyl chloride (Geon 101 EP), 5 parts of epoxidized soybean oil, 2 parts of a barium salt-cadmium salt-organic phosphite stabilizer, and 0.5 part of stearic acid was added 45 parts of a plasticizer. The mixture was blended at room temperature and then charged to a two-roll, steam-heated, differential speed mill whose roll surface temperature was maintained at 300° F. The mixture was milled for 5 minutes and then removed from the rolls as a flexible sheet 0.020 inch in thickness. The properties of the compositions, which were determined by standard test methods, are given in the table that follows.

TABLE

| Plasticizer | Product of Example 2 | Product of Example 4 | Product of Example 5 | Product of Example 6 | Product of Example 7 | Product of Example 8 | Di (2-ethylhexyl) Phthalate | Di (isodecyl) 4,5-epoxytetra hydrophthalate |
|---|---|---|---|---|---|---|---|---|
| Tensile Strength (p.s.i.)(ASTM D412-51T) | 2,970 | 2,930 | 2,940 | 2,900 | 2,830 | 2,655 | 2,680 | 2,885 |
| 100% Modulus (ASTM D412-51T) | 1,495 | 1,632 | 2,110 | 1,390 | 2,070 | 1,015 | 1,400 | 1,895 |
| Elongation (Percent) (ASTM D412-51T) | 350 | 350 | 325 | 390 | 305 | 385 | 345 | 345 |
| Durometer Hardness (at 15 sec.) (ASTM D676-49T) | 77 | 79 | 79 | 68 | 87 | 63 | 77 | 79 |
| Brittle Point (° C.) (ASTM D746-44T) | −31 | −25 | −10 | −35 | −9 | −41 | −31 | −22 |
| Volatility (Percent) (ASTM D1203-52T) | 1.8 | 1.11 | 1.53 | 5.36 | 0.70 | 7.9 | 3.3 | 0.47 |
| Extraction by Mineral Oil (Percent) | 4.55 | 2.87 | 1.97 | 9.54 | 1.12 | 11.3 | 2.48 | 2.12 |
| Extraction by Hexane (Percent) | 13.45 | 12.45 | 13.2 | 13.7 | 6.58 | 14.2 | 13.0 | 13.3 |
| Extraction by Soapy Water (Percent) | 0.75 | 0.76 | 1.75 | 0.77 | 3.69 | 5.32 | 0.68 | 1.52 |
| Heat Stability (Minutes at 180° C. before severe yellowing occurs) | 180 | 90 | >210 | 120 | 120 | 120 | 120 | >210 |
| Light Stability (Hours in Atlas Fadeometer before exudation and degradation occur) | >500 | >500 | >500 | >500 | >500 | >500 | >500 | >500 |

From the data in the foregoing table it will be seen that the products of the present invention are excellent primary plasticizers for vinyl halide resins and that the resinous compositions containing these plasticizers have properties that are at least equivalent to and in many ways superior to those of compositions containing the widely used plasticizers, di (2-ethylhexyl) phthalate and di (isodecyl) 4,5-epoxytetrahydrophthalate.

What is claimed is:

1. Epoxidized polycarboxylates that are the products of the addition of at least one mole of an unsaturated ester having the formula

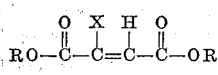

wherein each R represents a member individually selected from the group consisting of alkyl groups containing from 1 to 18 carbon atoms and aryl groups and X represents a member selected from the group consisting of hydrogen, methyl, halogen, phenyl, and halophenyl per mole of an ester of epoxidized fatty acids, said epoxidized fatty acids containing from 10 to 22 carbon atoms and from 1 to 3 epoxy groups, said addition being effected by heating said esters at a temperature in the range of approximately 30° to 250° C. in the presence of a free radical promoter.

2. Epoxidized polycarboxylates that are the products of the addition of approximately 1 mole to 2 moles of an unsaturated ester having the formula

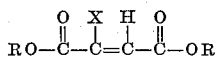

wherein each R represents a member individually selected from the group consisting of alkyl groups containing from 1 to 18 carbon atoms and aryl groups and X represents a member selected from the group consisting of hydrogen, methyl, halogen, phenyl, and halophenyl per mole of an ester of epoxidized fatty acids, said epoxidized fatty acids containing from 10 to 22 carbon atoms and from 1 to 3 epoxy groups, said addition being effected by heating said esters at a temperature in the range of 60°–180° C. in the presence of a free radical promoter.

3. Epoxidized polycarboxylates that are the products of the addition of approximately 1 mole to 2 moles of an unsaturated ester having the formula

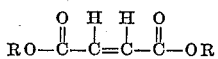

wherein each R represents a member individually selected from the group consisting of alkyl groups containing from 1 to 18 carbon atoms and aryl groups per mole of an ester of epoxidized fatty acids, said epoxidized fatty acids containing from 10 to 22 carbon atoms and from 1 to 3 epoxy groups, said addition being effected by heating said esters at a temperature in the range of 60° C. to 180° C. in the presence of a free radical promoter.

4. Epoxidized polycarboxylates as set forth in claim 3 wherein the epoxidized ester is epoxidized soybean oil having an oxirane oxygen content of approximately 5% to 8%.

5. Epoxidized polycarboxylates as set forth in claim 3 wherein the epoxidized ester is pentaerythritol tetra (epoxytallate) having an oxirane oxygen content of approximately 5% to 8%.

6. Epoxidized polycarboxylates as set forth in claim 3 wherein the epoxidized ester is 2-ethylhexyl epoxytallate having an oxirane oxygen content of approximately 5% to 8%.

7. Epoxidized polycarboxylates as set forth in claim 3 wherein the epoxidized ester is butyl epoxytallate having an oxirane oxygen content of approximately 5% to 8%.

8. Epoxidized polycarboxylates as set forth in claim 3 wherein the unsaturated ester is dibutyl maleate and the epoxidized ester is 2-ethylhexyl epoxytallate having an oxirane oxygen content of approximately 5% to 8%.

9. The process for the preparation of epoxidized polycarboxylates which comprises contacting an ethylenically unsaturated ester having the formula

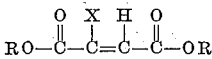

wherein each R represents a member individually selected from the group consisting of alkyl groups containing from 1 to 18 carbon atoms and aryl groups and X represents a member selected from the group consisting of hydrogen, halogen, methyl, phenyl, and halophenyl with an ester of epoxidized fatty acids, said epoxidized fatty acids containing from 10 to 22 carbon atoms and from 1 to 3 epoxy groups, in the amount of at least one mole of said ethylenically unsaturated ester per mole of said ester of epoxidized fatty acids at a temperature between approximately 30° C. and 250° C. in the presence of a free-radical promoter.

10. The process for the preparation of epoxidized polycarboxylates which comprises heating an ethylenically unsaturated ester having the formula

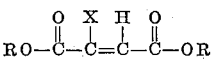

wherein each R represents a member individually selected from the group consisting of alkyl groups containing from 1 to 18 carbon atoms and aryl groups and X represents a member selected from the group consisting of hydrogen, halogen, methyl, phenyl, and halophenyl with an ester of epoxidized fatty acids, said epoxidized fatty acids containing from 10 to 22 carbon atoms and from 1 to 3 epoxy groups, in the amount of approximately 1 to 2 moles of said ethylenically unsaturated ester per mole of said ester of epoxidized fatty acids at a temperature between approximately 60° C. and 180° C. in the presence of a free-radical promoter.

11. The process of claim 10 wherein the unsaturated ester is dibutyl maleate.

12. The process of claim 10 wherein the epoxidized ester is 2-ethylhexyl epoxytallate.

13. A resinous composition comprising a vinyl halide resin plasticized with an epoxidized polycarboxylate that is the product of the addition of at least one mole of an unsaturated ester having the formula

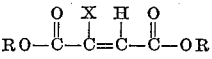

wherein each R represents a member individually selected from the group consisting of alkyl groups containing from 1 to 18 carbon atoms and aryl groups and X represents a member selected from the group consisting of hydrogen, methyl, halogen, phenyl, and halophenyl per mole of an ester of epoxidized fatty acids, said epoxidized fatty acids containing from 10 to 22 carbon atoms and from 1 to 3 epoxy groups, said addition being effected by heating said esters at a temperature in the range of approximately 30° to 250° C. in the presence of a free radical promoter.

14. A resinous composition comprising polyvinyl chloride plasticized with an epoxidized polycarboxylate that is the product of the addition of approximately 1 mole to 2 moles of an unsaturated ester having the formula

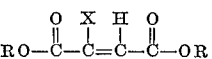

wherein each R represents a member individually selected from the group consisting of alkyl groups containing from 1 to 18 carbon atoms and aryl groups and X represents a member selected from the group consisting of hydrogen, methyl, halogen, phenyl, and halophenyl per mole of an ester of epoxidized fatty acids, said epoxidized fatty acids containing from 10 to 22 carbon atoms and from 1 to 3 epoxy groups, said addition being effected by heating said esters at a temperature in the range of 60° to 180° C. in the presence of a free radical promoter.

15. A resinous composition as set forth in claim 14 wherein the epoxidized ester is epoxidized soybean oil having an oxirane oxygen content of approximately 5% to 8%.

16. A resinous composition as set forth in claim 14 wherein the epoxidized ester is pentaerythritol tetra (epoxytallate) having an oxirane oxygen content of approximately 5% to 8%.

17. A resinous composition as set forth in claim 14 wherein the epoxidized ester is 2-ethylhexyl epoxytallate having an oxirane oxygen content of approximately 5% to 8%.

18. A resinous composition as set forth in claim 14 wherein the epoxidized ester is butyl epoxytallate having an oxirane oxygen content of approximately 5% to 8%.

19. A resinous composition as set forth in claim 14 wherein the unsaturated ester is dibutyl maleate.

20. A resinous composition as set forth in claim 14 wherein the unsaturated ester is dibutyl fumarate.

References Cited by the Examiner

UNITED STATES PATENTS

| | | | |
|---|---|---|---|
| 2,745,846 | 5/1956 | Dazzi | 260—348 |
| 2,757,151 | 7/1956 | Dazzi | 260—23 X |
| 2,862,012 | 11/1958 | Dazzi | 260—23 X |
| 2,891,083 | 6/1959 | Dazzi | 260—404.8 |
| 2,938,044 | 5/1960 | Dazzi | 260—404.8 |
| 3,046,237 | 7/1962 | Rosenfelder et al. | 260—23 |
| 3,074,997 | 1/1963 | Lynn et al. | 260—468 |

OTHER REFERENCES

"Epoxidation of Maleic Acid-Treated Fatty Esters," S. Komori et al., Chemical Abstracts, vol. 55, page 25331.

Varnish Constituents, Chatfield, Leonard Hill Ltd., London, 1953, page 212.

"New Tung Oil Derivatives," U.S.D.A. Agricultural Research Service, Bulletin ARS–72–7, 1953.

Chemical and Engineering News, September 12, 1955, page 3759.

LEON J. BERCOVITZ, *Primary Examiner.*

DONALD E. CZAJA, *Examiner.*

RONALD W. GRIFFIN, C. W. IVY,

*Assistant Examiners.*